(12) United States Patent
Knies et al.

(10) Patent No.: US 7,153,990 B2
(45) Date of Patent: Dec. 26, 2006

(54) PROCESS FOR PREPARING CROSSLINKED AND BRANCHED ORGANOPOLYSILANES

(75) Inventors: Wolfgang Knies, Burghausen (DE); Karin Boegershausen, Herderstrasse (DE); Annemarie Weinhart, Haiming (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 11/257,346

(22) Filed: Oct. 24, 2005

(65) Prior Publication Data
US 2006/0094891 A1 May 4, 2006

(30) Foreign Application Priority Data
Oct. 28, 2004 (DE) .................. 10 2004 052 423

(51) Int. Cl.
*C08G 77/06* (2006.01)
*C07F 7/04* (2006.01)

(52) U.S. Cl. ........................... 556/431; 528/14

(58) Field of Classification Search ................ 556/431
See application file for complete search history.

(56) References Cited

U.S. PATENT DOCUMENTS

| 4,921,321 A | 5/1990 | Weidmann |
| 5,905,139 A | 5/1999 | Mori et al. |

FOREIGN PATENT DOCUMENTS

| EP | 0 949 289 A1 | 10/1999 |
| JP | 9309954 | 12/1997 |

OTHER PUBLICATIONS

Patent Abstract of Japan, vol. 1997, No. 4, Corresponding to JP-A-09309954.
Patent Abstract of Japan, vol. 1998, No. 14, Corresponding to JP-A-10237177.
English Abstract of Japanese JP-A 9309954, May 1996.

*Primary Examiner*—Samuel Barts
(74) *Attorney, Agent, or Firm*—Brooks Kushman P.C.

(57) ABSTRACT

A process for preparing crosslinked or branched organopolysilanes involves reacting halosilanes with alkali metal and/or alkaline earth metal, the reaction mixture, immediately after reaction has ended, being treated at at least 50° C. for at least 30 seconds with a mineral treating agent which is one or more polysilicic acids, silicates or aluminosilicates.

12 Claims, No Drawings

PROCESS FOR PREPARING CROSSLINKED AND BRANCHED ORGANOPOLYSILANES

BACKGROUND OF THE INVENTION

1. Field of the Invention

The invention relates to a process for preparing crosslinked and branched organopolysilanes.

2. Background Art

The preparation of polysilanes is described, for example, in line feed EP 949289 A and U.S. Pat. No. 4,921,321 A. Organopolysilanes which have been prepared by known processes and have linear portions, branches, and crosslinks are very difficult to filter, since they form fine precipitates. This severely increases the cost for their preparation. JP 9309954 A describes the purification of organopolysilanes by dissolution in organic solvents, treatment with diatomaceous earth and subsequent filtration.

SUMMARY OF THE INVENTION

It is an object of the invention to improve the filterability of branched and crosslinked organopolysilanes. This and other objects are surprisingly and unexpectedly achieved by treatment of a polysilane reaction mixture, immediately following synthesis of the polysilanes by reaction of halosilanes with active metal, with a polysilic acid, silicate, or aluminosilicate mineral treating agent for at least 30 seconds, at a temperature of at least 50° C.

DETAILED DESCRIPTION OF THE PREFERRED EMBODIMENT(S)

The invention thus provides a process for preparing crosslinked or branched organopolysilanes which contain at least one unit of the general formulae 1 and 2

$$RSi\equiv \quad (1),$$

$$=Si= \quad (2),$$

at least one unit of the general formula 3

$$R_2Si= \quad (3),$$

and optionally units of the general formula 4

$$R_3Si- \quad (4),$$

wherein silanes of the general formulae 1a and 2a $$RSiX_3 \quad (1a),$$

$$SiX_4 \quad (2a),$$

silane(s) of the general formula 3a $$R_2SiX_2 \quad (3a),$$

and optionally silane(s) of the general formula 4a $$R_3SiX \quad (4a),$$

where
R is hydrogen or a hydrocarbyl radical having from 1 to 18 carbon atoms and
X is fluorine, chlorine or bromine, are reacted with elemental alkali metal and/or alkaline earth metal, the reaction mixture, immediately after reaction has ended, being treated at at least 50° C. for at least 30 seconds with a mineral treating agent comprising polysilicic acids, silicates and aluminosilicates. The crosslinked or branched organopolysilanes which are thereby formed are readily filterable.

The reaction of the silanes is effected preferably at at least 20° C. and at most 200° C., in particular at least 60° C. and at most 160° C. If the temperature in the reaction of the silanes is at least 50° C., the reaction mixture is not cooled below 50° C. before the treatment with mineral treating agent. If the temperature in the reaction of the silanes is below 50° C., the reaction mixture is heated to at least 50° C. before the treatment with mineral treating agent.

In the process, preferably at least 2 molar parts, more preferably at least 5 molar parts of silanes of the general formulae 1a and 2a, are used per 100 molar parts of silane of the general formula 3a. Preferably at most 60 molar parts, more preferably at most 30 molar parts of silanes of the general formulae 1a and 2a are used per 100 molar parts of silane of the general formula 3a.

R is preferably a hydrocarbyl radical which is free of ethylenically or acetylenically unsaturated bonds and has from 1 to 18 carbon atoms. Examples of hydrocarbyl radicals R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as cyclopentyl, cyclohexyl, cycloheptyl, and methylcyclohexyl radicals; aryl radicals such as the phenyl, naphthyl and anthryl and phenanthryl radicals; alkaryl radicals such as o-, m-, p-tolyl radicals, xylyl radicals and ethylphenyl radicals; aralkyl radicals such as the benzyl radical, and the α- and the β-phenylethyl radicals.

The R radical is preferably a phenyl radical or linear alkyl radical, in particular having from 1 to 10, and more preferably from 1 to 6, carbon atoms. Particularly preferred hydrocarbyl radicals R are n-propyl, ethyl and in particular methyl radicals.

X is preferably chlorine.

The elemental metals used are preferably Li, Na, K and Mg. When magnesium is used, preference is given to the presence of transition metal halides in the reaction, in particular of $ZnCl_2$ and $FeCl_3$.

The mineral treating agent may be added in powder form or granulated form. The polysilicic acids and silicates may be low in cations, such as kieselguhr, which occurs, for example, as diatomaceous earth or infusorial earth, or rich in cations, such as beryl, opal, talc, etc. A preferred example of diatomaceous earth is Celite 455 (Merck-Schuchardt). In the aluminosilicates, some silicon atoms of the silicates are replaced by aluminum atoms. Examples of aluminosilicates are mica, feldspars, perlites and zeolites. A preferred example of perlites is Perlite C (from Pall).

The reaction is preferably carried out under protective gas, in particular Ar or $N_2$, and the pressure in the reaction is preferably 1 bar, but may also be considerably higher or lower.

The reaction is preferably carried out in an aprotic solvent. Examples of such solvents are ethers such as dioxane, tetrahydrofuran, diethyl ether, diisopropyl ether, and diethylene glycol dimethyl ether; hydrocarbons such as pentane, n-hexane, hexane isomer mixtures, heptane, octane, dodecane, wash benzine, petroleum ether, benzene, toluene, xylenes, or tetrahydronaphthalene; or mixtures of these solvents.

The term solvent does not mean that all reaction components have to dissolve therein. The reaction may also be carried out in a suspension or emulsion of one or more reaction components. The reaction may also be performed in a solvent mixture having a miscibility gap, wherein at least one reaction component is soluble in each of the mixing phases.

The reaction mixture comprising the mineral treating agent is preferably filtered after it has cooled.

The solution of the organopolysilanes, after treatment with mineral treating agent, is preferably precipitated with alcohol. Preferred alcohols are methanol, ethanol, isopropanol, propanol and butanols.

All of the above symbols of the above formulae are each defined independently of one another. In all formulae, the silicon atom is tetravalent.

In the context of the present invention, unless stated otherwise, all amounts and percentages are based on the weight, all temperatures are 20° C. and all pressures are 1.013 bar (abs.). All viscosities are determined at 25° C.

EXAMPLES

Example 1

Inventive

A five-neck flask which was equipped with a stirrer, a dropping funnel, a temperature sensor, a reflux condenser and a gas feed was purged with nitrogen. This was initially charged with approx. 1500 ml of toluene, into which 137 g of sodium cut into small pieces were introduced. The mixture was heated to 106–107° C. Subsequently, the stirrer was started with gradually rising stirrer speed. The final stirrer speed was about 430 rpm. After approx. 30 minutes, 420 g of phenylmethyldichlorosilane, 39 g of methyltrichlorosilane and 17 g of dimethyldichlorosilane were added dropwise. The addition rates were selected such that the toluene was kept boiling (approx. 110° C.). In general, the dropwise addition lasted for approx. 60 minutes. On completion of the addition, the temperature of the mixture was increased to 110° C. and reaction was continued for a further hour. Aluminosilicate (20 g of Perlite C) was then added and the mixture was boiled for a further 10 minutes. Subsequently, the heater was removed and the reaction mixture was cooled slowly. The mixture cooled to room temperature was filtered through a pressure filter (1 atm of nitrogen) with a filter paper (pore size 5 µm). The filtration was complete within 1 minute. The resulting solution was concentrated and the polysilane was precipitated by pouring the solution into isopropanol. The polysilane was filtered off and dried.

Example 2

Noninventive

Example 1 was carried out with the sole difference that no aluminosilicate was added. The filtration took several hours.

Example 3

Inventive

Example 1 was repeated with the difference that 5 g of Perlite C were added. The filtration was completed within 1 minute.

Example 4

Inventive

Example 1 was repeated with the difference that 20 g of diatomaceous earth (Celite 455) were added. The filtration was completed within 1 minute.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing crosslinked or branched organopolysilanes which contain at least one unit of the formulae 1 and/or 2

$$RSi\equiv \quad (1),$$

$$=Si= (2),$$

at least one unit of the formula 3

$$R_2Si= \quad (3),$$

and optionally one or more units of the formula 4

$$R_3Si— \quad (4),$$

comprising reacting silane(s) of the formulae 1a and 2a $$RSiX_3 \quad (1a),$$

$$SiX_4 \quad (2a),$$

silane(s) of the formula 3a $$R_2SiX_2 \quad (3a),$$

and optionally, silane(s) of the formula 4a $$R_3SiX \quad (4a),$$

where
   R is hydrogen or a hydrocarbyl radical having from 1 to 18 carbon atoms and
   X is fluorine, chlorine or bromine,
   with elemental alkali metal, elemental alkaline earth metal, or combinations thereof, and
   immediately after reaction has ended, treating the reaction mixture at at least 50° C. for at least 30 seconds with a mineral treating agent comprising one or more polysilicic acids, silicates or aluminosilicates.

2. The process of claim 1, in which from 2 to 60 molar parts of silane(s) of the formulae 1a and 2a are used per 100 molar parts of silane(s) of the formula 3a.

3. The process of claim 1, in which R is a phenyl radical or linear alkyl radical having from 1 to 10 carbon atoms.

4. The process of claim 2, in which R is a phenyl radical or linear alkyl radical having from 1 to 10 carbon atoms.

5. The process of claim 1, in which at least one elemental metal is selected from the group consisting of Li, Na, K and Mg.

6. The process of claim 2, in which at least one elemental metal is selected from the group consisting of Li, Na, K and Mg.

7. The process of claim 3, in which at least one elemental metal is selected from the group consisting of Li, Na, K and Mg.

8. The process of claim 4, in which at least one elemental metal is selected from the group consisting of Li, Na, K and Mg.

9. The process of claim 1, in which the reaction is carried out in an aprotic solvent.

10. The process of claim 1, in which the mineral treating agent is selected from kieselguhr and perlites.

11. The process of claim 1, wherein an elemental alkaline earth metal is employed, together with a transition metal salt.

12. The process of claim 11, wherein the transition metal salt is one or more of $ZnCl_2$ and $FeCl_3$.

* * * * *